(12) United States Patent
Raounak

(10) Patent No.: US 9,866,544 B2
(45) Date of Patent: Jan. 9, 2018

(54) SYSTEMS AND METHODS FOR LOCATION-BASED AUTHENTICATION

(71) Applicant: AOL Inc., Dulles, VA (US)

(72) Inventor: El-Amine M. Raounak, Bethesda, MD (US)

(73) Assignee: Oath Inc., Dulles, VA (US)

( * ) Notice: Subject to any disclaimer, the term of this patent is extended or adjusted under 35 U.S.C. 154(b) by 0 days.

(21) Appl. No.: 15/350,704

(22) Filed: Nov. 14, 2016

(65) Prior Publication Data

US 2017/0063829 A1 Mar. 2, 2017

Related U.S. Application Data

(63) Continuation of application No. 14/201,248, filed on Mar. 7, 2014, now Pat. No. 9,525,972.

(51) Int. Cl.
| | | |
|---|---|---|
| *H04L 29/06* | (2006.01) | |
| *H04W 4/02* | (2009.01) | |
| *H04L 29/08* | (2006.01) | |
| *H04W 12/06* | (2009.01) | |
| *H04L 12/26* | (2006.01) | |

(52) U.S. Cl.
CPC ............ *H04L 63/08* (2013.01); *H04L 43/106* (2013.01); *H04L 63/0853* (2013.01); *H04L 63/107* (2013.01); *H04L 67/22* (2013.01); *H04W 4/023* (2013.01); *H04W 4/025* (2013.01); *H04W 4/028* (2013.01); *H04W 12/06* (2013.01); *H04L 2463/121* (2013.01)

(58) Field of Classification Search
CPC ... H04L 67/22; H04L 63/0853; H04L 63/107; H04L 43/106; H04L 63/08; H04L 2463/121; H04W 4/025; H04W 12/06; H04W 4/023; H04W 4/028
See application file for complete search history.

(56) References Cited

U.S. PATENT DOCUMENTS

| | | | |
|---|---|---|---|
| 2003/0217137 A1* | 11/2003 | Roese ........................ | G01S 5/02 709/223 |
| 2005/0005150 A1* | 1/2005 | Ballard .................... | G06F 21/31 726/22 |
| 2009/0102712 A1 | 4/2009 | Heffez | |
| 2009/0158404 A1 | 6/2009 | Hahn et al. | |
| 2012/0244885 A1* | 9/2012 | Hefetz .................... | G06Q 20/32 455/456.2 |

(Continued)

OTHER PUBLICATIONS

Extended European Search Report dated Jul. 21, 2015, in corresponding European Patent Application No. 15 15 8040.4, filed on Mar. 6, 2015 (6 pages).

*Primary Examiner* — Techane Gergiso
*Assistant Examiner* — Tri Tran
(74) *Attorney, Agent, or Firm* — Bookoff McAndrews, PLLC

(57) ABSTRACT

Systems and methods are disclosed for performing location-based authentication using location-aware devices. One method includes: receiving an access request comprising authentication credentials and a first location from a first location-aware device; receiving a second location from a second location-aware device associated with the authentication credentials; and upon determining that the first location and second location are within a pre-determined distance, authenticating the authentication credentials.

19 Claims, 7 Drawing Sheets

(56) References Cited

U.S. PATENT DOCUMENTS

2013/0046692 A1* 2/2013 Grigg .................... G06Q 40/00
705/44
2015/0073987 A1* 3/2015 Dutt ................... G06Q 20/4016
705/44

* cited by examiner

SYSTEMS AND METHODS FOR LOCATION-BASED AUTHENTICATION

PRIORITY

This application is a continuation of and claims the benefit of priority from U.S. application Ser. No. 14/201,248, filed Mar. 7, 2014, which is incorporated by reference in its entirety.

TECHNICAL FIELD

Various embodiments of the present disclosure relate generally to providing location-based authentication. More specifically, exemplary embodiments of the present disclosure relate to systems and methods for providing multi-factor authentication and/or validation utilizing location-aware devices.

BACKGROUND

Identity authentication has concerned online users and online companies since the advent of networking and the Internet. Passwords are often used to restrict access to certain content and to validate users, even though passwords present certain drawbacks. Users often find it difficult to remember and keep track of different credentials or logins (e.g., usernames and/or passwords) for their various online accounts and may either forget this information or provide incorrect login information. As a result, many users use the same password for many different websites and/or frequently have to reset login information. Password reuse poses a security problem, because if a malicious user obtains the password for one account, access to multiple accounts is effectively gained. Further, password reset functionality may be abused in order to hijack a user account.

One attempt to mitigate the disadvantages of traditional passwords involves the use of so-called "two-step verification" or "two-step authentication," which leverages the use of some physical key carried by a user. For example, many known methods involve the use of a pocket-sized authentication token that is carried by the user and displays a changing passcode on an LCD or e-ink display, which must be typed in at an authentication screen. The number is typically derived from a shared secret by a cryptographic process that makes it infeasible to work out the secret from the sequence of numbers, e.g., using a hash or other cryptography combined with a challenge. The same process repeated on the authentication server will yield the same result if the correct secret was used. Another technique for two-step authentication involves receiving a username and password from a user, and then sending, e.g., by SMS, a unique code to the user through a linked device, such as a mobile phone. The user receives the unique code at the mobile phone, and types it into the website to prove that the user has possession of the device, and is therefore likely the user associated with the previously input credentials.

Unfortunately, many users have not yet implemented two-step verification or other password improvements to their online accounts. Often this is due to the added inconvenience of entering a code in addition to a regular password. This is especially true of people who opened online accounts years ago, or before certain other password or user verification techniques were implemented. To thwart this vulnerability, many online websites have increased the requirements associated with resetting accounts or passwords, by requiring all users attempting to reset login information to either submit substantial additional user data or call the online company and speak to a representative to attempt to prove their identity to gain access to their online account. However, these methods make it more difficult for even legitimate users to reset and access their accounts, and they do not differentiate between users of different levels of trustworthiness. For many people, an online company would have to resort to the undesirable options of either allowing each user to reset a password with minimal verification and trusting that they are who they say they are, or have to prevent the user from resetting a password, and instead insist on the undesirable workaround that the user abandon the account and start another.

Accordingly, a need exists for systems and methods for implementing a convenient multi-step verification process.

SUMMARY OF THE DISCLOSURE

According to certain embodiments, systems and methods are disclosed for providing location-based authentication using location-aware devices. One method includes: receiving an access request comprising authentication credentials and a first location from a first location-aware device; receiving a second location from a second location-aware device associated with the authentication credentials; and upon determining that the first location and second location are within a pre-determined distance threshold, authenticating the authentication credentials.

The method may include any one of, or a combination of, the following steps and/or features: designating the first location as a trusted location in response to determining that a number of successful authentications within a pre-determined distance of the first location is above a pre-determined threshold; sending an acknowledgement request to the second location-aware device upon determining that the first location is not a trusted location; determining whether the first location and second location are within a pre-determined distance upon receiving a confirmation to the acknowledgement request from the second location-aware device, and authenticating the authentication credentials upon determining that the first location and second location are within a pre-determined distance; in response to receiving a denial of the acknowledgment request from the second location-aware device, denying the access request; in response to receiving a denial of the acknowledgement request from the second location-aware device, disallowing further access requests from the first location-aware device; receiving a first timestamp associated with a forwarding time of the first location from the first location-aware device, receiving a second timestamp associated with a forwarding time of the second location and a third timestamp associated with a forwarding time of a third location from the second location-aware device, using the second timestamp and third timestamp, determining the velocity of the second location-aware device, using the velocity of the second location-aware device, determining a past location of the second location-aware device at the forwarding time of the first location, and upon determining that the first location and the past location are within a pre-determined distance, authenticating the authentication credentials; receiving a first timestamp associated with a forwarding time of the first location from the first location-aware device, providing the first timestamp to the second location-aware device, wherein the second location-aware device maintains a log of past device locations and associated timestamps, and receiving the second location from the second location-aware device, wherein the second location corresponds to a past location from the log of past device locations, and wherein the past device location is associated with an associated timestamp substantially similar to the first timestamp.

According to certain embodiments, systems are disclosed for providing location-based authentication using location-aware devices. One system provides a storage device storing instructions for managing location-based authentication; and a processor configured to execute the instructions to perform a method including: receiving an access request comprising authentication credentials and a first location from a first location-aware device; receiving a second location from a second location-aware device associated with the authentication credentials; and upon determining that the first location and second location are within a pre-determined distance, authenticating the authentication credentials.

According to certain embodiments, a computer-readable medium is disclosed that, when executed by a computer system, causes the computer system to perform a method for performing location-based authentication, the method including: receiving an access request comprising authentication credentials and a first location from a first location-aware device; receiving a second location from a second location-aware device associated with the authentication credentials; and upon determining that the first location and second location are within a pre-determined distance, authenticating the authentication credentials.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems of using location-aware devices to validate a user's identity. Specifically, the present disclosure describes systems and methods for providing multi-factor authentication and/or validation utilizing location-aware devices. As described above, each time a network service provider receives an access request, there is some likelihood that the request was generated by the person associated with the username, but there is also some likelihood that the request was generated by a malicious entity, whether a person, company, or machine (e.g., a server or "bot"). The present disclosure is directed to evaluating the location of a trusted device to determine trustworthiness levels associated with the interaction, and to accordingly modify the authentication requirements when providing access to a network resource. Embodiments of the present disclosure will now be described with respect to FIGS. 1-7.

Figure 1:
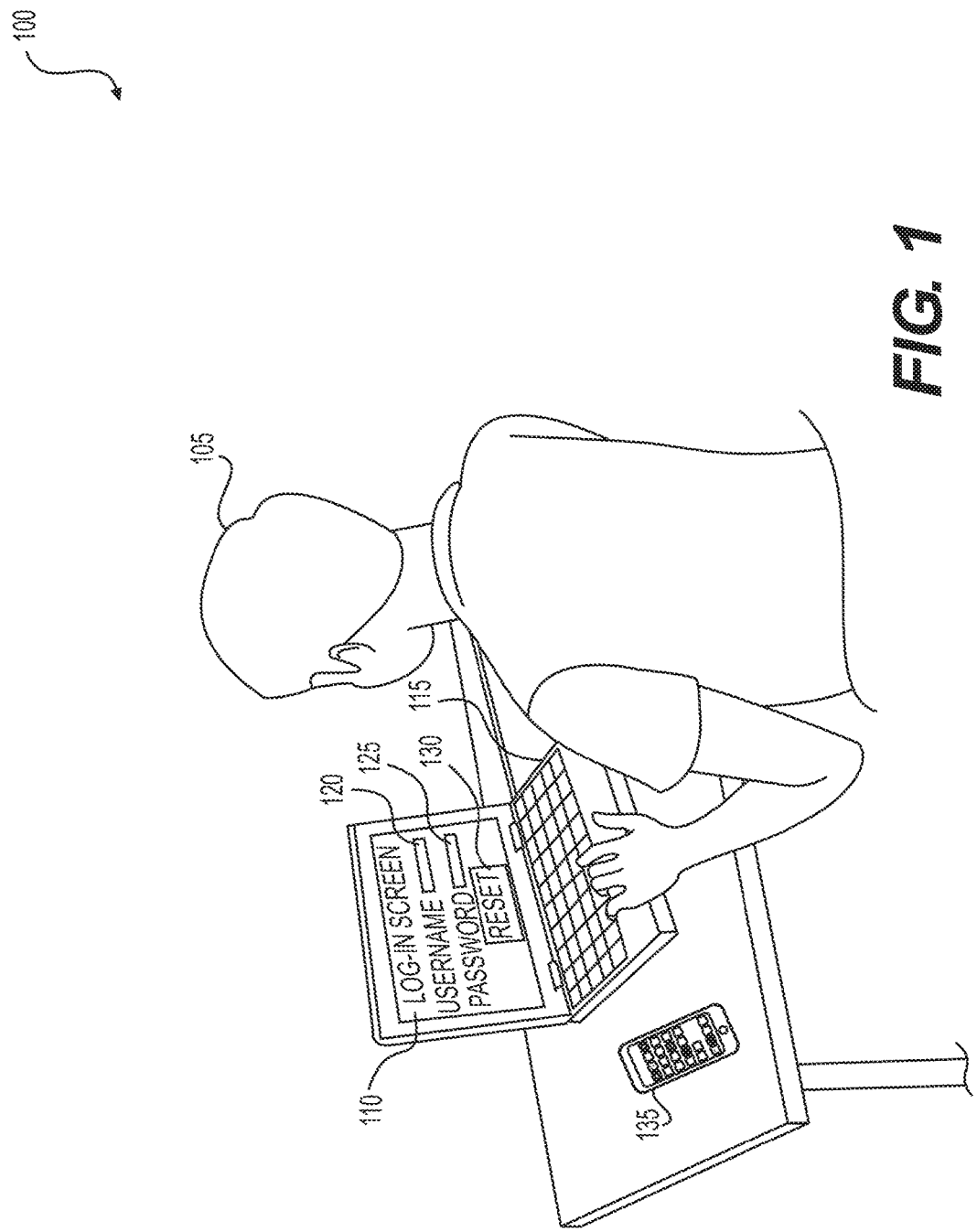
FIG. 1 is an illustration of a user entering authentication credentials through a web page, according to an exemplary embodiment of the present disclosure.

FIG. 1 is an illustration of an exemplary environment 100 in which a user 105 may be attempting to access a restricted network resource through a web page 110 using an electronic device 115, according to an exemplary embodiment of the present disclosure. As shown in FIG. 1, a user 105 may visit the website or web page 110, which requires a user to gain access to an online account by logging in electronically, and submitting unique login information previously generated by the provider of the online account or previously created and submitted by the user. The login information may include user credentials comprising any unique identifier (e.g. a username, email address, account number, etc.) and a password and/or pin. For example, as shown in FIG. 1, the login screen of the web page 110 may include prompts for the user to submit a username 120 and password 125, and also may include a user element or link 130 enabling the user to request to reset the username and/or password by having his or her identity validated or authenticated, before gaining access.

Examples of types of user online accounts may include online portals, email services, e-commerce sites, banking sites, financial sites, document management sites, electronic research sites, content sites, or any other website involving a user logging-in.

The username 120 may be any unique string of characters provided by the user to the authentication server and approved by the online account during initial setup of the online account, or may be automatically created by the online account and provided to the user. The online account may verify that the username 120 is unique to the user such that no other user has the same username 120. For example, if during initial setup of the online account, the user selects a username that is already being used by a current user of the online account, the online account may prompt the user to select a different username, or may provide suggestions of available unique usernames. In addition, the password 125 may be any string of characters provided by the user to the online account and approved by the online account either during initial setup of the online account or at any time after the initial online account setup. The online account may provide password requirements to the user to ensure that the password is secure. For example, the online account may require that a password be at least eight characters in length and includes a symbol, a number, and a letter. The password 125 may also be required in later steps of the authentication process, or not required at all, as the user may be authenticated according to other techniques of the present disclosure.

The reset user element or link 130 may be any selectable icon on the online account web page 110 that the user may select in order to request to reset the user's username 120 and/or password 125. The reset user element or link 130 may appear on the web page 110 having the prompts for and/or forms into which a user may enter the requested/required username 120 and password 125, or the reset user element or link 130 may be provided on a different but related web page. The reset user element or link 130 may be automatically, electronically displayed by the online account at any time during the user's attempt to login. For example, the reset user element or link 130 may only be displayed after the failed attempt to login, such as after the user provides an incorrect username 120 and/or password 125. Alternatively, the user may request a reset without any attempt of providing login and/or password information. For example, if the user does not remember either of the username and/or password, the user may request to reset his or her username and/or password without even attempting to enter those credentials.

The trusted device 135 is associated with one or more user accounts, and may be used to assist in a multi-step authentication process by providing another authentication factor and/or to respond to an acknowledgment request. The trusted device 135 may be a user's personal computer (PC), whether desktop or laptop, a tablet device, a mobile device, a home- or vehicle-installed computer, or any other type of computing device.

Multi-factor or multi-step authentication is an authentication approach that requires more than one form of authentication to verify the legitimacy of a transaction or a user. The username 120 and password 125 (e.g., PINs, etc.) are examples of knowledge factors, i.e. something that the user knows. Knowledge factors are the most common form of authentication, but alone they are vulnerable to security failures that may cause a malicious entity to obtain the knowledge factors. Multi-step authentication requires another type of authentication, such as a possession factor or an inherence factor. Possession factors focus on something that the user possesses, such as a wireless token, a physical device or magnetic strip card, etc. An inherence factor determines something inherent to the user such as fingerprints, voice, iris scan, or other biometric identification, and may also be required. Authentication schemes that require two factors are known as two-factor or two-step authentication.

As an example of two-step authentication, a user 105 may enter a username 120 and a password 125 on the online account web page 110. These authentication credentials may be provided to an authentication server. The authentication server may authenticate the username 120 and password 125. If the username and password are entered correctly, the authentication server may send a one-time password via short message service (SMS) or text message to the trusted device 135 associated with the provided username and password. The user 105 receives the text message and provides the one-time password to the authentication server using the online account web page 110. Thus, in creating multiple layers of defense, multi-step authentication provides additional security against the unauthorized access to restricted content.

However, multi-step authentication, as shown in the above example, typically requires additional steps to be taken by the user (e.g., the user has to fumble with entering and/or remembering the code). These additional steps add both time and user frustration to the authentication process. Accordingly, a need exists for systems and methods for implementing a convenient multi-step authentication process. While known factors of multi-step authentication include knowledge factors, possession factors, and inherence factors, exemplary embodiments of the present disclosure further include location factors.

Figure 2:
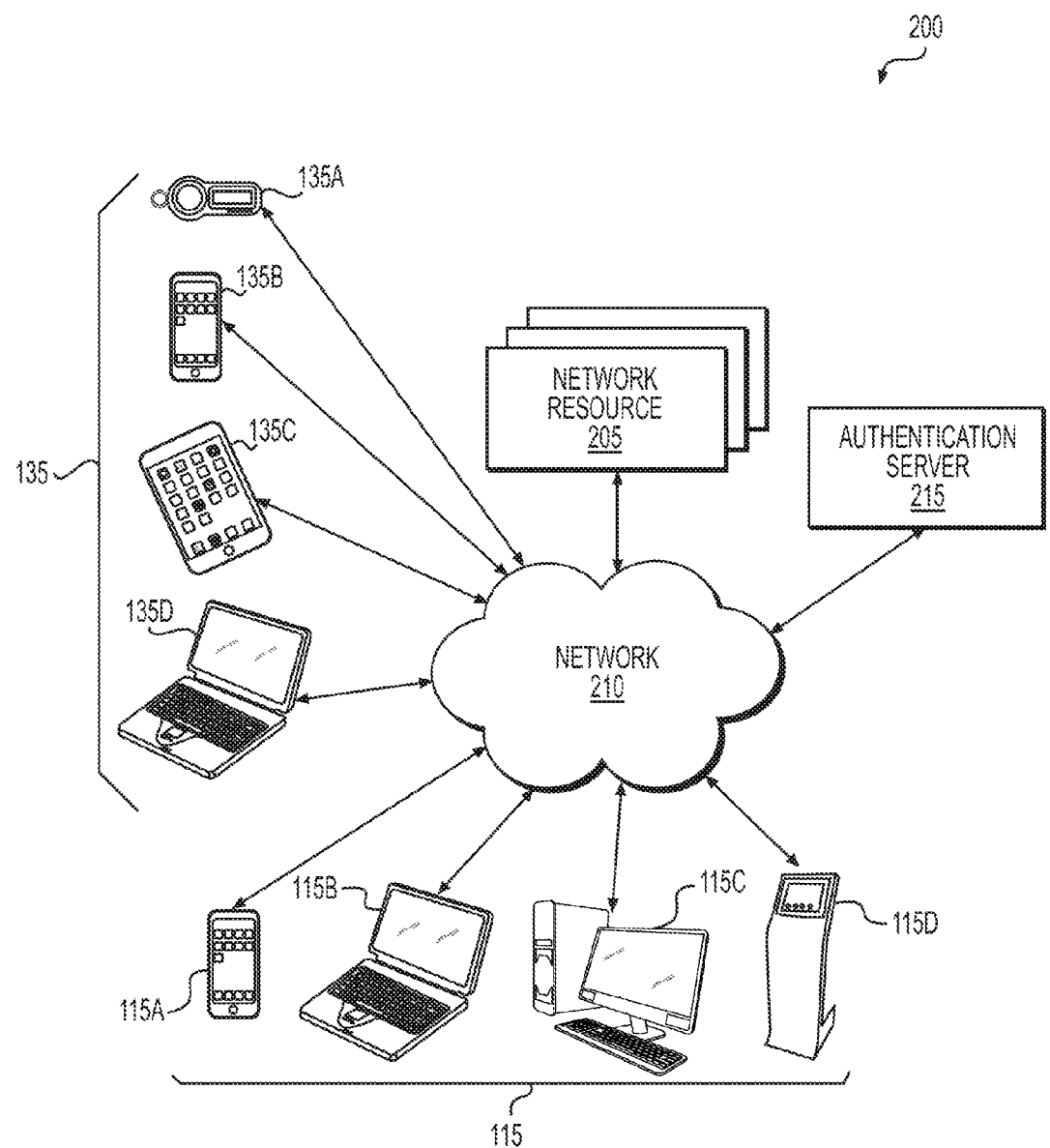
FIG. 2 is a block diagram of a communications system configured to perform location-based authentication, according to exemplary embodiments of the present disclosure.

FIG. 2 is a block diagram of an environment and system 200 for performing authentication using location factors, according to an exemplary embodiment of the present disclosure. Specifically, FIG. 2 illustrates an exemplary environment 200 in which devices 115(*a*)-115(*d*) ("115") may communicate with network resources 205 via network 210. Each network resource 205 may be located on a physical local or physical remote server, or locally on the devices 115 themselves. Access to each network resource 205 may be restricted, and the user of devices 115 may be authenticated by an authentication server 215 prior to accessing the network resource 205. The authentication server 215 may perform multi-step authentication utilizing one or more trusted devices 135(*a*)-135(*d*) ("135").

Each of the devices 115 and trusted devices 135 may be any device connected to the Internet or any other network that may enable communication of data between the device and a server of the online account such as the authentication server 215. Each user may have, and each technique presented herein may involve, at least one trusted device 135 and at least one device 115. For example, each of the devices 115 and trusted devices 135 may be a user's personal computer (PC), whether desktop or laptop, a tablet device, a mobile device, a home- or vehicle-installed computer, or any other type of computing device. A trusted device 135(*a*) may also be a dedicated component such as a hardware token containing buttons and a display sufficient to perform techniques presented herein. More generally, the trusted devices 135 may be any computing device which has been previously authenticated to become associated with one or more user accounts such that it may be used in the multi-step authentication of another device.

The devices 115 and trusted devices 135 may be location-aware, i.e. each device may learn, track, log, record, and/or provide its geographic or spatial location. Location information may be tracked using Global Positioning System (GPS) techniques, and may be stored in the form of latitude and longitude coordinates. Location information may also be tracked and/or stored as positions or signal strength relative to wireless base stations, wireless access points, street intersections or other known points of interest from which a precise location can be calculated, either by the devices themselves or by an external server or device such as the authentication server 215.

Device Internet Protocol (IP) addresses or other network identifiers may also be used by a network element such as the authentication server 215 to determine the position of devices 115 or trusted devices 135. While examples are provided of techniques to determine the location of devices 115 and trusted devices 135, alternative techniques would be consistent with embodiments of the present disclosure.

Each of the electronic devices 115, trusted devices 135, one or more network resources 205, and one or more authentication servers 215 may be in communication with each other via a network 210, such as the Internet. The network 210 may also be a Local Area Network (LAN), Wide Area Network (WAN), Storage Area Network (SAN), Metropolitan Area Network (MAN), or any other type of electronic network, and may be wired and/or wireless. The network 210 may utilize physical or virtual switches, routers, gateways, bridges, repeaters, hubs and other network elements to enable communication between any of the devices and servers in the network environment 200.

Figure 3:
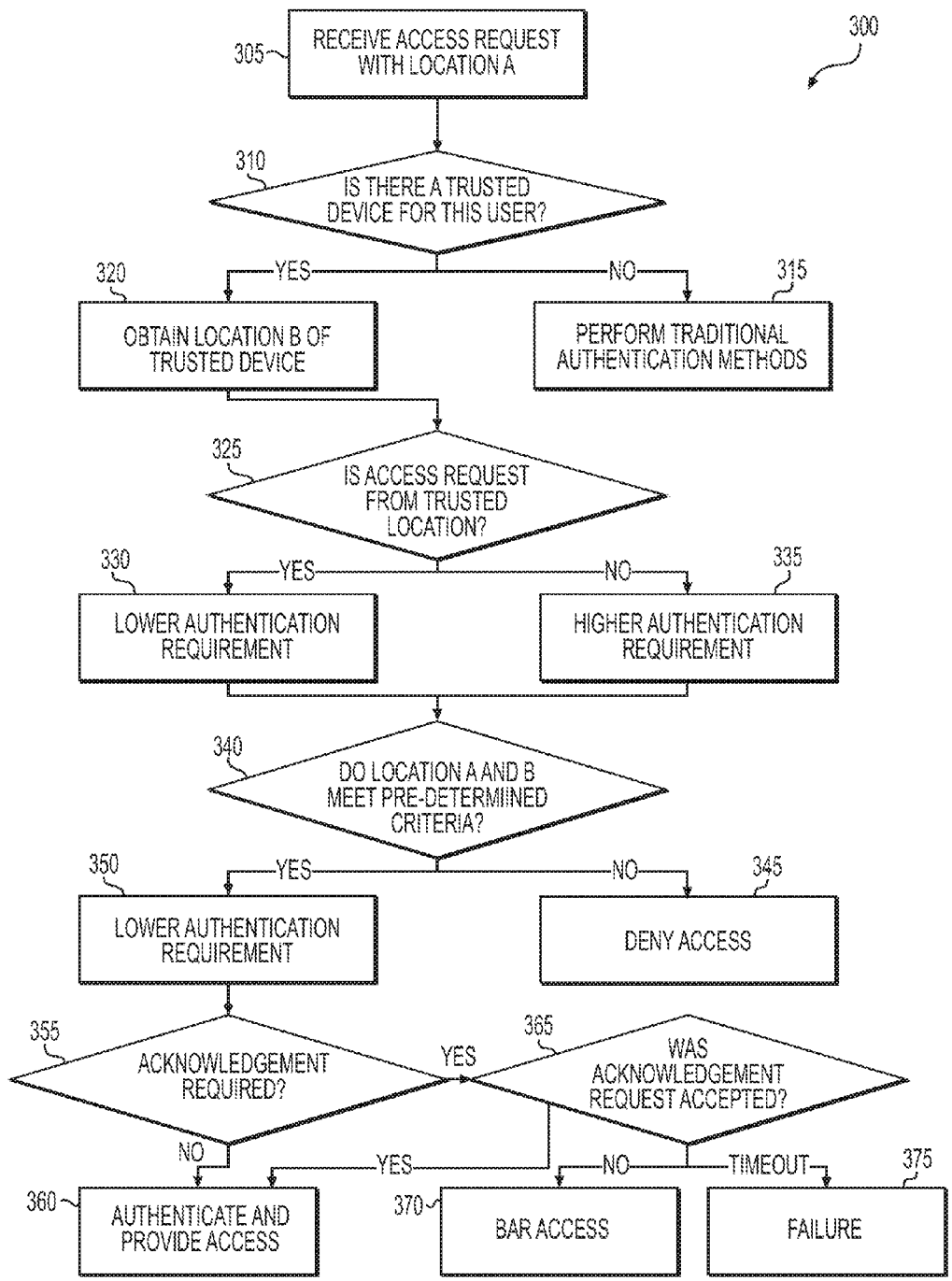
FIG. 3 is a flow diagram of methods for performing location-based authentication, according to exemplary embodiments of the present disclosure.

FIG. 3 shows a flow diagram of exemplary methods 300 of electronically receiving an access request and performing location-based authentication utilizing techniques presented herein. At step 305, method 300 may include receiving, from a user 105, a request to access a restricted network resource 205. The request may contain authentication credentials such as a username 120 and a password 125. The password 125 may also be provided later in the authentication process, or not at all, depending on the authentication requirements determined during the methods 300. The password requirement may be user or network administrator configurable, and may be set depending on the level of security desired for the restricted network resource 205. The password may be authenticated at step 305, or at later steps in the authentication process shown in FIG. 3. The access request may be received from a device 115 and may contain a location A. Location A may be GPS coordinates, or any other information that does identify or may be used to identify, the location of the device 115 at substantially the same time as the sending of the access request. Location A may be provided by the device in the access request, or requested and/or provided at a later time.

The device 115, as well as any trusted device 135 used in techniques presented herein, may verify its identity with a network element such as the authentication server 215 during the authentication process. The device 115 and/or trusted device 135 may have previously had an authentication session with the authentication server, by which a key was provided to the trusted device. For example, during the prior authentication process, the device 115 or trusted device 135 may have sent a token to an authenticating network element such as the authentication server 215. The authentication server 215 may digitally sign the token with a key and provide it back to the device 115 or trusted device 135. During future communications and authentication sessions, the device 115 or trusted device 135 may provide the signed token containing the key to the authentication server 215 to verify identity. During this authentication session, the authentication server 215 may also verify that the device 115 or trusted device 135 accepts push notifications, which may be used in later authentication sessions. Devices 115 and/or trusted devices 135 that do not have keys or the ability to accept push notifications may still be allowed to participate in authentication sessions, although the authentication requirements may be higher. For example, the user may have to provide a password, provide acknowledgement feedback from a push notification, and/or provide some additional knowledge factor, possession factor, inherence factor, and/or location factor.

At step 310, the authentication server 215 may determine if there is a trusted device associated with the provided authentication credentials such as the username 120. If there is not, the authentication server 215 may perform traditional authentication methods at step 315, such as authenticating using the provided username 120 and password 125. Alternatively, the authentication server 215 may deny access to the restricted network resource 205 pending the designation and/or location of a trusted device 135 associated with the user account. Also alternatively, the authentication server 215 may perform simplified location factor authentication. If location A corresponds to a trusted location, for example a home or office from which authenticated logins are common, the authentication server 215 may authenticate the access request (i.e. the username and/or password) and provide access to the restricted network resource 205.

At step 320, if there is a trusted device 135 associated with the authentication information, a location B of the trusted device may be obtained by and/or provided to the authentication server 215. Location B may be provided by the trusted device itself or any other network element that maintains a record of the location of the trusted device. The form of the location B information may vary, as discussed above. At step 325, it may be determined whether the access request is from a device located at a trusted location. If the access request is not from a trusted location, the authentication requirements may be increased at step 335, or the access request may be denied altogether. Conversely, if the access request is from a trusted location, the authentication requirements may be lowered at step 330.

Trusted locations are manually or automatically pre-determined locations that may qualify for lower authentication requirements to gain access to a restricted network resource 205. Lower authentication requirements may include allowing a login without a password, not requiring a user acknowledgement of a push notification to a trusted device, foregoing a multi-factor authentication step, etc. A user may also be required to be located in a trusted location to gain access to the restricted network resource 205. If an access request is not initiated from a trusted location, higher authentication requirements including a password, push notification, or other multi-factor authentication may be required. Trusted locations may be designated manually by a user or administrator of the network resource 205 and/or authentication server 215.

Further, after a pre-determined number of successful authentications from a location or set of substantially similar locations for a given user or associated set of users, the location may be automatically considered a trusted location for that user. Each successful authentication may be within a pre-determined distance of one another, yet still be considered to be at the same location. For example, multiple logins may occur from different points within a building, yet all are considered successful authentications from the same location. The area within a pre-determined distance, such as a radius of any of the successful authentications, may be automatically designated a trusted area. Alternatively, locations may be recognized as logical entities, extending the trusted area beyond or within a pre-determined radius. For example, if a predetermined number of successful authentications occur within one building, the entire building may be designated as a trusted location, even if successful authentications from one portion of the building have never occurred. Further, the street in front of the building may not be designated as a trusted location, even though it may be a very short distance from successful authentication locations.

Step 325 may alternatively determine whether the access request was received from a distrusted location. For example, public spaces and publically-accessible spaces, such as parks and airports, may be automatically considered distrusted locations. Distrusted locations may be identified if there are above a pre-determined number of known devices at the location or at the location within a pre-determined period of time. Location information may also be cross-referenced with data about known public spaces. Further, if one or more failed, incorrect or malicious login attempts are received, a location and pre-determined radius thereof may be considered distrusted. Locations may also receive a neutral or mid-level designation. For example, new access request location attempts may initially be designated as neutral. A trusted or mid-level location may be automatically downgraded to mid-level or distrusted, respectively, if there are a pre-determined number of one or more failed or malicious access requests. Conversely, distrusted or mid-level locations may be automatically upgraded to mid-level or trusted locations, respectively, if there are a pre-determined number of one or more successful access requests.

The authentication requirements for trusted locations, mid-level locations, and distrusted locations may vary by user and may be configured automatically or manually by a user and/or administrator. For example, login attempts from trusted locations may only require a username and the presence of a trusted device. Mid-level locations may require a password, the presence of a trusted device, but not a manual acknowledgement from the trusted device. Finally, distrusted locations may require higher levels of authentication, including username and password credentials, the presence of a trusted device, and manual acknowledgment from the user of the trusted device. Variations of these features are possible and within the scope of exemplary embodiments according to the present invention.

At step 340, location A and location B may be tested according to pre-determined criteria. If either location A or location B, corresponding to the locations of the device requesting access and the location of the trusted device, are not both in a trusted area, the access request may be denied at step 345. Alternatively, higher authentication requirements may be required, examples of which are provided above. Step 340 may also detect whether location A and location B are within a pre-determined radius or distance of each other. This pre-determined radius may be set by a user or administrator. If locations A and B are not within the pre-determined radius, the access request may be denied at step 345. Again alternatively, higher authentication requirements may be required in this case. Step 340 may also determine if locations A and B are within the same logical location, for example within the same building, regardless of the radius of separation. If locations A and B are not within the pre-determined radius, steps may be taken to determine if the device requiring access and the trusted device were within the pre-determined radius in the past, as will be discussed with reference to FIG. 5 below.

A further possibility is that both the trusted device and the device requesting access are trusted devices. For example, a mobile device and a desktop computer may be pre-approved devices that, when located within a pre-determined distance, allow access to restricted content with minimal authentication, such as a username. The authentication server 215 may receive an access request from a device which contains at least a unique device identifier, device location and username. Using the device identifier, the authentication server 215 may determine that the device is a trusted device for the username, and further determine that a second trusted device exists associated with the username. The authentication server 215 may request a second location from the second trusted device. If the trusted device and second trusted device are within a pre-determined distance threshold, authentication and access may be granted. Alternatively, the authentication requirements may be lowered. This feature may or may not be allowed if the two devices are not within a trusted area or trusted logical location.

If locations A and B meet the one or more predetermined criteria of step 340, the authentication requirement may be lowered at step 350. Alternatively, if the authentication requirements were set higher at any point during the process of FIG. 3, they may not be able to be subsequently lowered.

At step 355, a determination may be made as to whether an acknowledgment from one or more trusted devices is required. An acknowledgement may be a stricter authentication requirement imposed in steps 335, 345, or per user and/or administrator requirements. An acknowledgment may be in the form of a push notification to the at least one trusted device. A push notification is a request initiated by a network element onto a device. For example, when an access request is received for restricted content, if the trusted device is within a pre-determined radius, a push notification may be sent to the trusted device inquiring as to whether the access request is approved. The user of the trusted device may either approve or deny the access request of the push notification using the interface of the trusted device. The acknowledgment required at step 355 may also be a client pull, or other form of notification delivery, although a client pull may take longer than a push notification. The acknowledgement may also require the user to enter a pin or password on the trusted device, and thus there may be a split on where access credentials are entered.

If the acknowledgment was not required at step 355, authentication with the provided authentication credentials may occur at step 360. If any authentication credentials, such as a password, are missing, incorrect or have subsequently become required, at step 360 those authentication credentials may be requested. Once all required authentication credentials are received and validated, access to the restricted content may be provided.

If the acknowledgment was required at step 355, the acknowledgment may be sent to the at least one trusted device. If the acknowledgment was successful and confirmed, the final authentication with the provided authentication credentials may occur at step 360. If a pre-determined number of successful acknowledgments occur, the trust level of an area or logical location may automatically increase until it is a trusted location. Thus, as successful acknowledgments and/or granted access requests occur, multiple areas and/or logical locations may automatically become trusted.

If the acknowledgement was unsuccessful or denied, access to the restricted network resource 205 may be denied by the authentication server 215 at step 370. Further, login attempts or any further access requests from any device from that geographic location (or pre-determined distance therefrom) or logical location for the given user may be banned for a pre-determined time period, or banned permanently. Locations may also be added or removed from the banned list by the user and/or administrator. Banning further access requests avoids a denial-of-service attack by which a malicious user may repeatedly trigger multiple push notifications to the trusted device, which may be in the possession of a non-malicious user.

If the user of the at least one trusted device does not respond within a pre-determined period of time, the request may time out. This may happen because a user fails to respond to the acknowledgment request in time, due to network delay, or due to network disconnection of the trusted or other device. If the acknowledgment request times out, the access request may fail, though access requests may be reattempted. The user requesting access to the restricted network resource 205 may be required to re-enter the username and password and begin the authentication process of FIG. 3 again. If repeated timeouts occur, further attempts to authenticate a device 115 may be banned either permanently or for a pre-determined period of time. Users and/or administrators may add or remove devices from the banned device list, as discussed above.

While the steps shown in FIG. 3 illustrate exemplary embodiments of the present disclosure, the ordering of steps 305-375 may vary.

Figure 4:
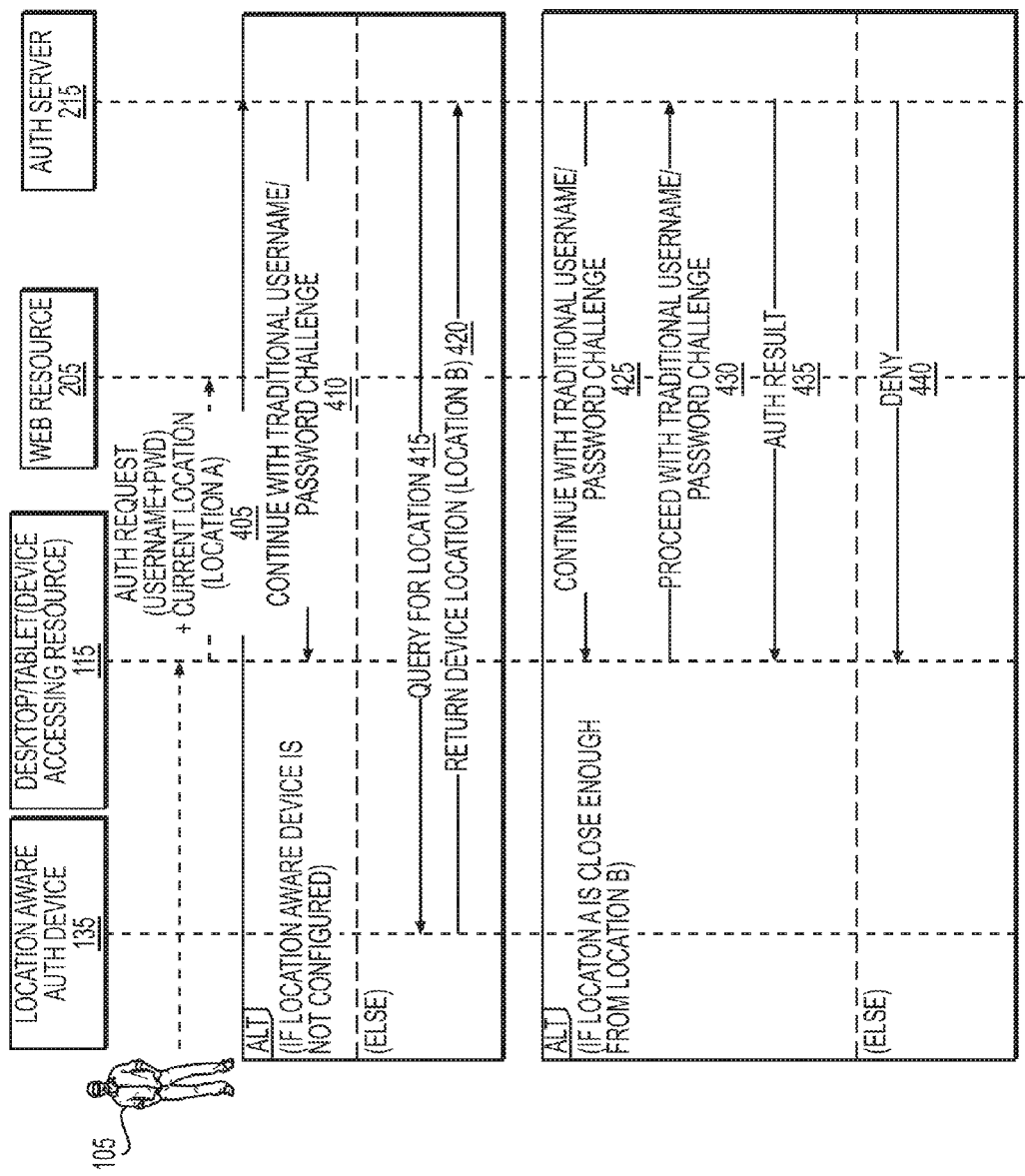
FIG. 4 is a ladder diagram of methods for performing location-based authentication from a trusted location, according to exemplary embodiments of the present disclosure.

Reference is now made to FIG. 4, which shows a ladder diagram of an example method for performing location-based authentication. At step 405, a user may submit an access request at a device 115. This access request may include a username and password. The device 115 may be location-aware, and provide location A to a restricted network resource 205. The restricted network resource 205 or authentication server 215 may also request location A from the device 115 if it was not provided in the access request. At step 410, if a location-aware trusted device 135 is not configured, the authentication server 215 may continue with traditional authentication techniques such as a username and password along with challenge questions, pins, etc. If a trusted device 135 is configured and associated with the user account, at step 415 the authentication server may request the location of the trusted device 135. At step 420, the trusted device 135 may return the location B to the authentication server 215. If locations A and B are within a pre-determined distance of each other, at step 425 username and password and other authentication challenges to the device requesting access 115 may proceed. At step 430, the response to the authentication challenge(s) is sent to the authentication server 215, and the result is returned at step 435, which may result in access being granted or denied to the restricted network resource 205. In the example of FIG. 4, if location A and B are not within a pre-determined distance of each other, at step 440 the access request will be denied.

In the examples of FIG. 3 and FIG. 4, access may be denied if locations A and B are not within a pre-determined distance of each other. However, since locations A and B may be obtained at difference times due to network lag and other delays, access may be improperly denied when the user is moving. For example, with reference to FIG. 3, if a user is in a moving vehicle and is in possession of both the device requesting access 115, and the trusted device 135, location A will be sent at time t at step 305. At some later time t+Δ, the authentication server may request and receive location B from the trusted device. Since the user is moving quickly, location B may be outside of the pre-determined distance from location A, even though in reality the devices are in the same location.

Figure 5:
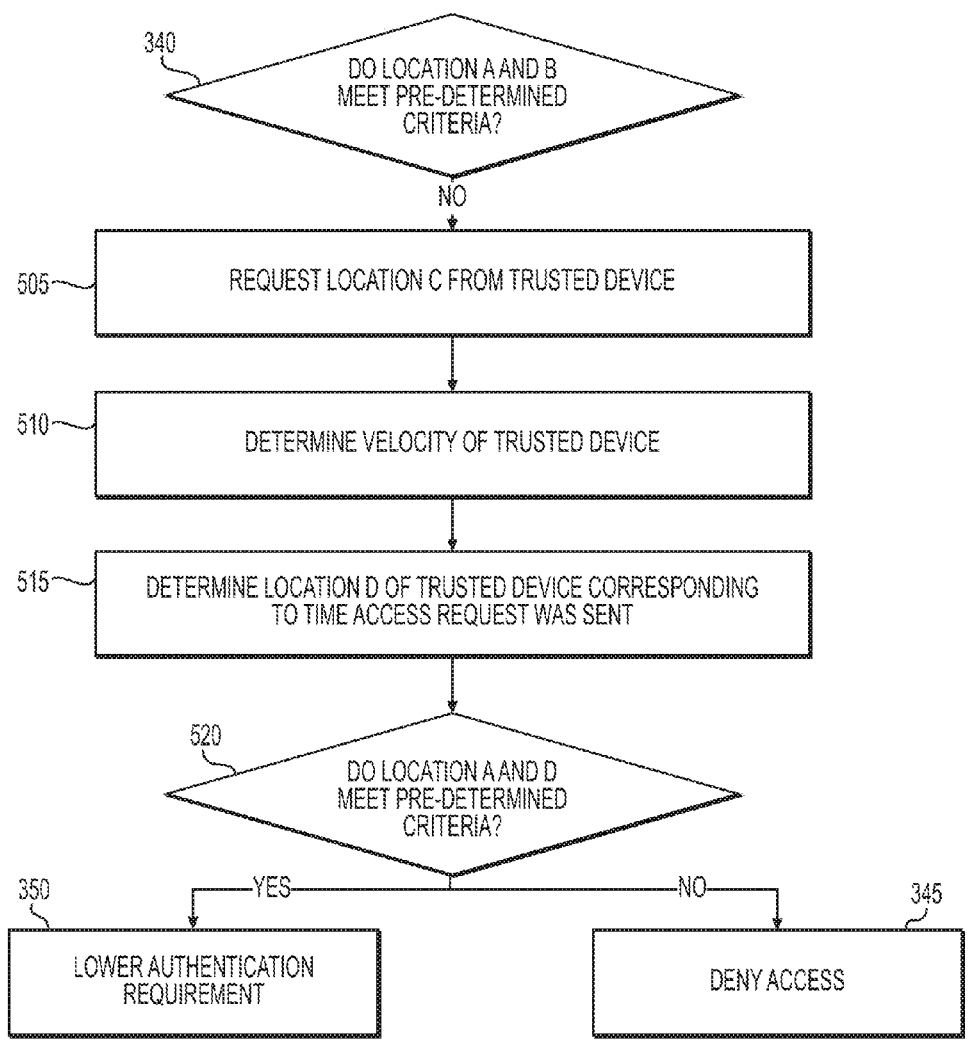
FIG. 5 is a flow diagram of methods of determining the locations of moving devices, according to exemplary embodiments of the present disclosure.

Reference is now made to FIG. 5, which is a flow diagram presenting an example solution to this problem. As discussed regarding FIG. 3, at step 340 it may be determined whether locations A and B are within a pre-determined distance of each other. If not, an additional check may be performed to account for a moving user. In this technique, when locations are provided by location-aware devices to the authentication server 215, corresponding timestamps are also provided. For example, when the device requesting access provides location A in step 305, a timestamp A will also be provided corresponding to the time the device requesting access was at location A. Similarly, location B will store and/or provide associated timestamp B indicating the time the trusted device was at location B. At step 505, the authentication server may further request location C from the trusted device, along with associated timestamp C indicating a time C that the trusted device was at location C. When received, regarding the trusted device, the authentication server will have location B with timestamp B, and location C with timestamp C. At step 510, by examining the distance between locations B and C, and the difference in time between timestamp B and timestamp C, the approximate speed and direction (velocity) of the trusted device may be determined.

Using the determined velocity, at step 515a location D may be calculated corresponding to the approximate location of the trusted device at the time of timestamp A. If locations A and D are within a pre-determined distance, then the location criterion may be met, and a lower authentication requirement is assigned at step 350. If locations A and D are not within the predetermined distance, access to the restricted network content 205 may be denied, as discussed above in regards to step 345.

This technique may be performed in several similar ways. A second method may request a location C and timestamp from the device requesting access 115, rather than from the trusted device 135. Thus, the velocity of the device requesting access would be determined in step 510, and the location D of the device requesting access would be determined at the time of timestamp B.

In a third method, the trusted device 135 may maintain a log of past locations and corresponding timestamps. When a device requests access and provides location A with timestamp A at step 305, the authentication server 215 may provide the timestamp A to the trusted device. The trusted device may retrieve the past location corresponding to the timestamp in the log closest to timestamp A. A fourth method is a variation by which the device requesting access may maintain a log of past locations and corresponding timestamps. When a device requests access and provides location A at step 305, the authentication server 215 may obtain location B and corresponding timestamp B from the trusted device 135. The authentication server 215 may then provide timestamp B to the device requesting access. The device requesting access 115 may then search its log and return its past location corresponding to the closest timestamp to timestamp B.

In yet another variation, multiple locations and timestamps may be requested from both the trusted device 135 and device requesting access 115. The authentication server 115 may determine the velocity of both devices, and hence determine if the devices are moving in the same direction at the same speed, and if they are within a pre-determined distance of each other at any given time.

Figure 6:
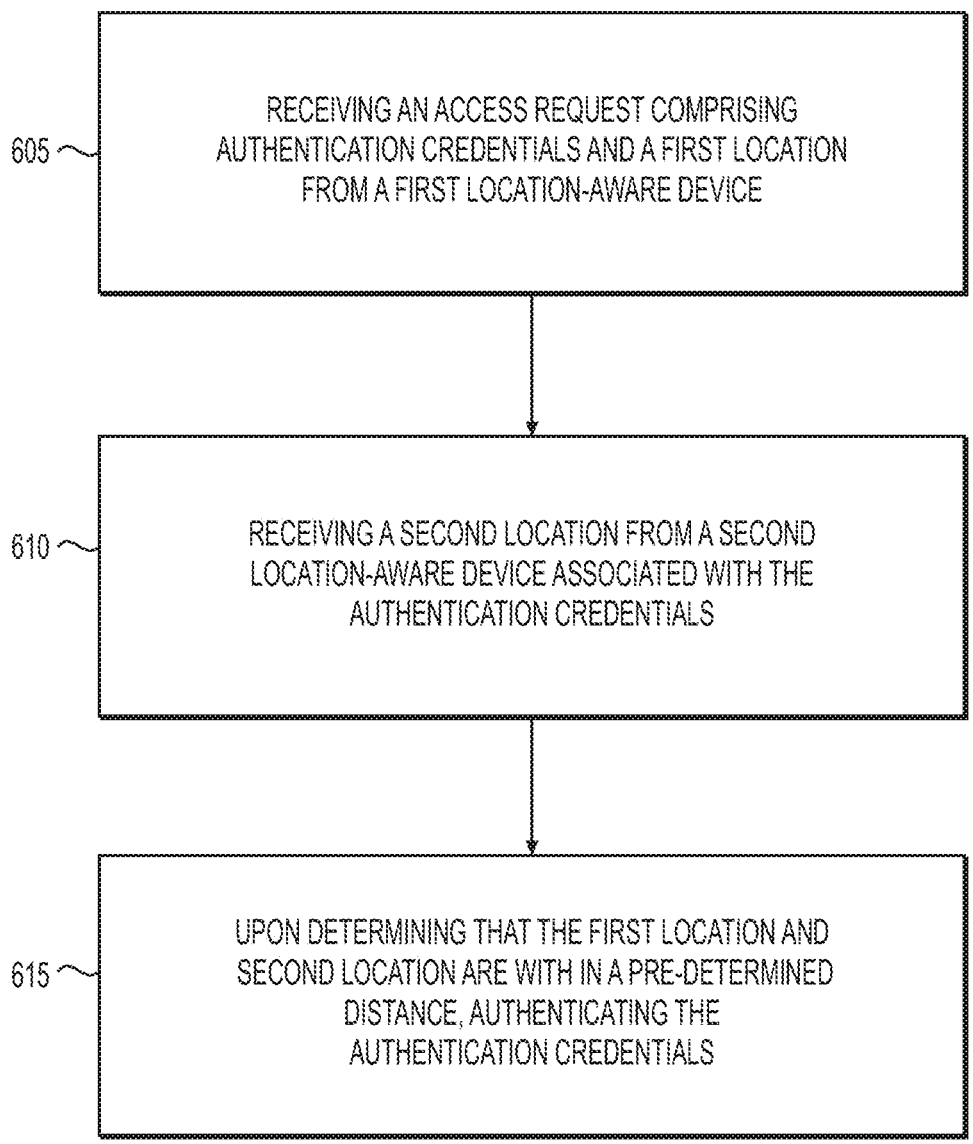
FIG. 6 is a flow diagram of an example method for performing location-based authentication, according to exemplary embodiments of the present disclosure.

FIG. 6 is a flow diagram of a method for performing location-based authentication. At step 605, an access request comprising authentication credentials and a first location from a first location-aware device is received. At step 610, a second location from a second location-aware device associated with the authentication credentials is received. At step 615, authentication credentials are authenticated Upon determining that the first location and second location are within a pre-determined distance.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

Figure 7:
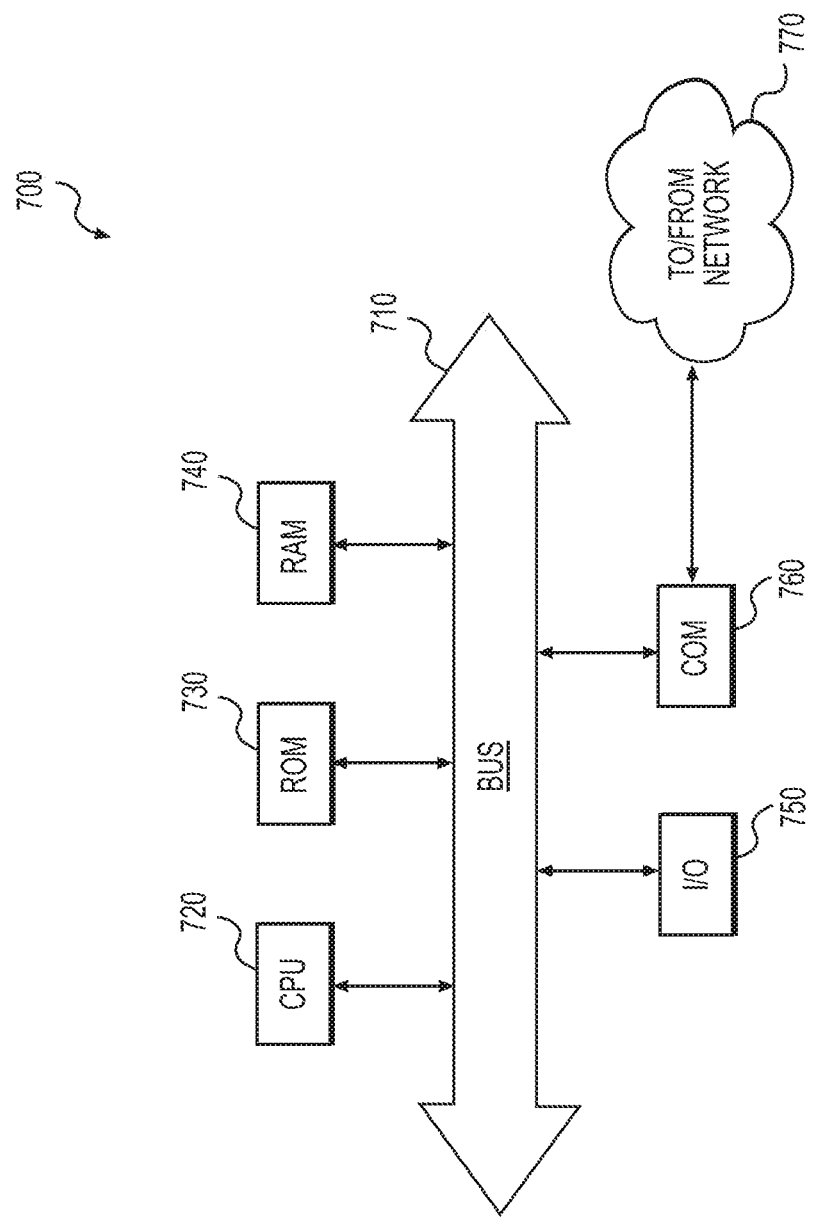
FIG. 7 is a simplified functional block diagram of a computer configured to function according to exemplary embodiments of the present disclosure.

FIG. 7 provides a functional block diagram illustration of general purpose computer hardware platforms. FIG. 7 illustrates a network or host computer platform 700, as may typically be used to implement a server, such as the network resource 205, the authentication server 215, and/or a location-aware devices 135 or 115. It is believed that those skilled in the art are familiar with the structure, programming, and general operation of such computer equipment and as a result the drawings should be self-explanatory.

A platform for a server or the like 700, for example, may include a data communication interface for packet data communication 760. The platform may also include a central processing unit (CPU) 720, in the form of one or more processors, for executing program instructions. The platform typically includes an internal communication bus 710, program storage, and data storage for various data files to be processed and/or communicated by the platform such as ROM 730 and RAM 740, although the computer platform 700 often receives programming and data via network communications 770. The hardware elements, operating systems, and programming languages of such equipment are conventional in nature, and it is presumed that those skilled in the art are adequately familiar therewith. The computer platform 700 also may include input and output ports 750 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method, comprising:
    receiving, by an authentication server, an access request comprising authentication credentials from a first location-aware user device, wherein the first location-aware user device is associated with a user account, and wherein the access request includes a first timestamp and a first location from the first location-aware user device;
    receiving, by the authentication server, a second timestamp and a second location from a second location-aware user device, wherein the second location-aware user device is associated with the user account and the authentication credentials;
    determining, by the authentication server, whether the first location and the second location are within a pre-determined threshold distance,
    wherein upon determining that the first location and second location are within a pre-determined threshold distance, authenticating the authentication credentials,
    wherein upon determining that the first location and second location are not within a pre-determined threshold distance, receiving, by the authentication server, a third timestamp and a third location from the second location-aware user device;
    determining, by the authentication server, the speed and direction of movement of the second location-aware user device based on the second timestamp, second location, third timestamp, and third location;
    determining, by the authentication server, a fourth location of the second location-aware user device based on the speed and direction of movement of the second location-aware user device; and
    determining, by the authentication server, whether the first location of the first location-aware user device and the fourth location of the second location-aware user device are within a pre-determined threshold distance,
    wherein upon determining, by the authentication server, that the first location of the first location-aware user device and the fourth location of the second location-aware user device are within a pre-determined threshold distance of each other, authenticating the authentication credentials.

2. The method of claim 1, further comprising:
    in response to determining that a number of successful authentications within a pre-determined threshold distance of the first location is above a pre-determined threshold, designating the first location as a trusted location.

3. The method of claim 1, wherein authenticating the authentication credentials further comprises:
    upon determining that the first location is not a trusted location, sending an acknowledgement request to the second location-aware user device.

4. The method of claim 3, further comprising:
    upon receiving a confirmation of the acknowledgement request from the second location-aware user device, determining whether the first location and second location are within a pre-determined threshold distance from each other; and
    upon determining that the first location and second location are within a pre-determined threshold distance, authenticating the authentication credentials.

5. The method of claim 3, further comprising:
    in response to receiving a denial of the acknowledgment request from the second location-aware user device, denying the access request.

6. The method of claim 3, further comprising:
in response to receiving a denial of the acknowledgment request from the second location-aware user device, disallowing further access requests from the first location-aware user device.

7. The method of claim 1, further comprising:
wherein upon determining that the first location and second location are not within a pre-determined threshold distance, receiving, by the authentication server, a fifth timestamp and a fifth location from the first location-aware user device;
determining, by the authentication server, the speed and direction of movement of the first location-aware user device based on the first timestamp, first location, fifth timestamp, and fifth location;
determining, by the authentication server, a sixth location of the first location-aware user device based on the speed and direction of movement of the first location-aware user device; and
determining, by the authentication server, whether the sixth location of the first location-aware user device and the second location of the second location-aware user device are within a pre-determined threshold distance,
wherein upon determining, by the authentication server, that the sixth location of the first location-aware user device and the second location of the second location-aware user device are within a pre-determined threshold distance of each other, authenticating the authentication credentials.

8. A system for performing location-based authentication, the system including:
a storage device storing instructions for managing location-based authentication; and
a processor configured to execute the instructions to perform a method including:
receiving, by an authentication server, an access request comprising authentication credentials from a first location-aware user device, wherein the first location-aware user device is associated with a user account, and wherein the access request includes a first timestamp and a first location from the first location-aware user device;
receiving, by the authentication server, a second timestamp and a second location from a second location-aware user device, wherein the second location-aware user device is associated with the user account and the authentication credentials;
determining, by the authentication server, whether the first location and the second location are within a pre-determined threshold distance,
wherein upon determining that the first location and second location are within a pre-determined threshold distance, authenticating the authentication credentials,
wherein upon determining that the first location and second location are not within a pre-determined threshold distance, receiving, by the authentication server, a third timestamp and a third location from the second location-aware user device;
determining, by the authentication server, the speed and direction of movement of the second location-aware user device based on the second timestamp, second location, third timestamp, and third location;
determining, by the authentication server, a fourth location of the second location-aware user device based on the speed and direction of movement of the second location-aware user device; and
determining, by the authentication server, whether the first location of the first location-aware user device and the fourth location of the second location-aware user device are within a pre-determined threshold distance,
wherein upon determining, by the authentication server, that the first location of the first location-aware user device and the fourth location of the second location-aware user device are within a pre-determined threshold distance of each other, authenticating the authentication credentials.

9. The system of claim 8, further comprising:
in response to determining that a number of successful authentications within a pre-determined threshold distance of the first location is above a pre-determined threshold, designating the first location as a trusted location.

10. The system of claim 8, wherein authenticating the authentication credential comprises, upon determining that the first location is not a trusted location, sending an acknowledgement request to the second location-aware user device.

11. The system of claim 10, further comprising:
upon receiving a confirmation of the acknowledgement request from the second location-aware user device, determining whether the first location and second location are within a pre-determined threshold distance from each other; and
upon determining that the first location and second location are within a pre-determined threshold distance, authenticating the authentication credentials.

12. The system of claim 10, further comprising:
in response to receiving a denial of the acknowledgment request from the second location-aware user device, denying the access request.

13. The system of claim 10, further comprising:
in response to receiving a denial of the acknowledgment request from the second location-aware user device, disallowing further access requests from the first location-aware user device.

14. The system of claim 8, further comprising:
wherein upon determining that the first location and second location are not within a pre-determined threshold distance, receiving, by the authentication server, a fifth timestamp and a fifth location from the first location-aware user device;
determining, by the authentication server, the speed and direction of movement of the first location-aware user device based on the first timestamp, first location, fifth timestamp, and fifth location;
determining, by the authentication server, a sixth location of the first location-aware user device based on the speed and direction of movement of the first location-aware user device; and
determining, by the authentication server, whether the sixth location of the first location-aware user device and the second location of the second location-aware user device are within a pre-determined threshold distance,
wherein upon determining, by the authentication server, that the sixth location of the first location-aware user device and the second location of the second location-aware user device are within a pre-determined threshold distance of each other, authenticating the authentication credentials.

15. A non-transitory computer-readable medium that, when executed by a computer system, cause the computer system to perform a method for performing location-based authentication, the method including:
- receiving, by an authentication server, an access request comprising authentication credentials from a first location-aware user device, wherein the first location-aware user device is associated with a user account, and wherein the access request includes a first timestamp and a first location from the first location-aware user device;
- receiving, by the authentication server, a second timestamp and a second location from a second location-aware user device, wherein the second location-aware user device is associated with the user account and the authentication credentials;
- determining, by the authentication server, whether the first location and the second location are within a pre-determined threshold distance,
- wherein upon determining that the first location and second location are within a pre-determined threshold distance, authenticating the authentication credentials,
- wherein upon determining that the first location and second location are not within a pre-determined threshold distance, receiving, by the authentication server, a third timestamp and a third location from the second location-aware user device;
- determining, by the authentication server, the speed and direction of movement of the second location-aware user device based on the second timestamp, second location, third timestamp, and third location;
- determining, by the authentication server, a fourth location of the second location-aware user device based on the speed and direction of movement of the second location-aware user device; and
- determining, by the authentication server, whether the first location of the first location-aware user device and the fourth location of the second location-aware user device are within a pre-determined threshold distance,
- wherein upon determining, by the authentication server, that the first location of the first location-aware user device and the fourth location of the second location-aware user device are within a pre-determined threshold distance of each other, authenticating the authentication credentials.

16. The non-transitory computer-readable medium of claim 15, the method further comprising:
- in response to determining that a number of successful authentications within a pre-determined threshold distance of the first location is above a pre-determined threshold, designating the first location as a trusted location.

17. The non-transitory computer-readable medium of claim 15, wherein authenticating the authentication credentials comprises, upon determining that the first location is not a trusted location, sending an acknowledgement request to the second location-aware user device.

18. The non-transitory computer-readable medium of claim 17, the method further comprising:
- upon receiving a confirmation of the acknowledgement request from the second location-aware user device, determining whether the first location and second location are within a pre-determined threshold distance from each other; and
- upon determining that the first location and second location are within a pre-determined threshold distance, authenticating the authentication credentials.

19. The non-transitory computer-readable medium of claim 15, the method further comprising:
- wherein upon determining that the first location and second location are not within a pre-determined threshold distance, receiving, by the authentication server, a fifth timestamp and a fifth location from the first location-aware user device;
- determining, by the authentication server, the speed and direction of movement of the first location-aware user device based on the first timestamp, first location, fifth timestamp, and fifth location;
- determining, by the authentication server, a sixth location of the first location-aware user device based on the speed and direction of movement of the first location-aware user device; and
- determining, by the authentication server, whether the sixth location of the first location-aware user device and the second location of the second location-aware user device are within a pre-determined threshold distance,
- wherein upon determining, by the authentication server, that the sixth location of the first location-aware user device and the second location of the second location-aware user device are within a pre-determined threshold distance of each other, authenticating the authentication credentials.

* * * * *